United States Patent [19]

Gioffre et al.

[11] Patent Number: 4,795,482
[45] Date of Patent: Jan. 3, 1989

[54] PROCESS FOR ELIMINATING ORGANIC ODORS AND COMPOSITIONS FOR USE THEREIN

[75] Inventors: Anthony J. Gioffre, Ridgefield, Conn.; Bonita K. Marcus, Rye, N.Y.

[73] Assignee: Union Carbide Corporation, Danbury, Conn.

[21] Appl. No.: 67,977

[22] Filed: Jun. 30, 1987

[51] Int. Cl.$^4$ ............................................. B01D 53/04
[52] U.S. Cl. .......................................... 55/75; 55/389; 423/245.1
[58] Field of Search ............................ 55/68, 75, 389; 423/335, 339, 245

[56] References Cited

U.S. PATENT DOCUMENTS

| | | | |
|---|---|---|---|
| 3,683,592 | 8/1972 | Kamm et al. | 55/389 X |
| 3,698,157 | 10/1972 | Allen et al. | 55/75 X |
| 3,724,170 | 4/1973 | Allen et al. | 55/75 X |
| 3,732,326 | 5/1973 | Chen | 55/75 X |
| 3,789,797 | 2/1974 | Brewer | 119/1 |
| 3,960,520 | 6/1976 | Allen | 55/75 X |
| 4,019,879 | 4/1977 | Rabo et al. | 55/75 X |
| 4,019,880 | 4/1977 | Rabo et al. | 55/75 X |
| 4,061,724 | 12/1977 | Grose et al. | 423/335 |
| 4,073,865 | 2/1978 | Flanigen et al. | 423/335 X |
| 4,085,704 | 4/1978 | Frazier | 119/1 |
| 4,090,981 | 5/1978 | Rodewald | 55/75 X |
| 4,257,885 | 3/1981 | Grose et al. | 55/75 X |
| 4,309,281 | 1/1982 | Dessau | 55/75 X |
| 4,331,694 | 5/1982 | Izod | 423/328 X |
| 4,344,927 | 8/1982 | Young | 423/335 X |
| 4,437,429 | 3/1984 | Goldstein et al. | 119/1 |
| 4,534,775 | 8/1985 | Frazier | 55/75 X |
| 4,604,110 | 8/1986 | Frazier | 55/389 X |
| 4,636,373 | 1/1987 | Rubin | 423/339 X |
| 4,648,977 | 3/1987 | Garg et al. | 210/673 |

*Primary Examiner*—Robert Spitzer
*Attorney, Agent, or Firm*—Richard G. Miller

[57] ABSTRACT

Odors attributable to organic molecular species are eliminated to levels below their olfactory detection level threshold by contact of the odor-producing species with a crystalline siliceous molecular sieve material having at least about 90 percent of its tetrahedral oxide units as $SiO_2$ tetrahedra, having pore apertures nominally at least 5.5 A in diameter, from which the original water of hydration has been substantially removed, having a capacity for adsorbed water of not greater than 10 weight percent when measured at 25° C. at a water vapor pressure ($p/p_o$) of 4.6 torr.

18 Claims, No Drawings

PROCESS FOR ELIMINATING ORGANIC ODORS AND COMPOSITIONS FOR USE THEREIN

BACKGROUND OF THE INVENTION

1. Field of the Invention

The present invention relates in general to the elimination of odors, and more particularly, to the process for removing odor-causing organic compounds from a liquid or gaseous medium by contact of the medium with a crystalline molecular sieve having certain critical physical and chemical properties hereinafter elucidated. The invention also relates to molecular sieve compositions suitable for use in the process.

2. Description of the Prior Art

Some substances are odorous, others are not. Just why this should be has been investigated many times, but to date remains an unanswered question, although many theories have been advanced. In accordance with the physical theory, odors are the interaction of high frequency radiations emitted by odorous substances with pigment granules in the olfactory receptors. The radiations are derived from the characteristic molecular vibration of each specific odorous substance, and distinctions between the various odors are made on the basis of the differences in wave lengths of the emitted radiations. In a chemical theory, it is the reactivity of functional portions of molecular species with olfactory receptors which is perceived by the brain as odor. It has more recently been speculated that the energy of the precise stimulus of odor receptors is derived electrochemically from an odorous material, more particularly from a modification of the bonding angles of a molecular species upon solution in the olfactory mucosa and a consequent alteration or unbalance of the electrostatic fields detected by the olfactory receptors. This theory could explain why multiple substances of quite different chemical structure may have the same or similar odors, and also why a mixture of two or more odorous substances may be perceived as having no odor.

Regardless of the reasons why certain substances exhibit odors, a vast number of means for eliminating those odors have been proposed. Generally, these processes can be placed in one of two categories, i.e., (a) odor masking in which a substance of strong yet relatively pleasant odor is introduced into the zone containing the substance of a less pleasant odor with the intent of overburdening the olfactory receptors with the dominant pleasant odor; or (b) sequestering the undesired odorous substance in a non-volatile form either by chemical reaction, adsorption or absorption on a sorbent exhibiting a sorptive preference for the odorous substance. It is the latter category which is of greater relevance to the present invention, although it is not known whether the mechanism involved is physical adsorption or chemisorption, or both.

By far the most commonly employed of the solid adsorbents is activated charcoal or active carbon, although silica gel, activated alumina, kieselguhr, fullers earth and other clay minerals and zeolites, alone or in combination, have also been proposed as odor "adsorbents". A mixture of silica gel, activated carbon and a zeolite is disclosed in U.S. Pat. No. 4,604,110 as the adsorbent for an air filter element for removing odors from indoor air. A mixture of alfalfa, bentonite clay and a binder is proposed in U.S. Pat. No. 3,789,797 for adsorbing and neutralizing odors of animal waste matter. In U.S. Pat. No. 4,437,429, the use of a hydrated zeolite in admixture with clay is proposed as being particularly useful for the control of odors from pet litter, it being observed that the use of zeolites by themselves as litter material has generally been unsuccessful due to their poor water adsorption properties as compared with clays. For the adsorption of certain odors from animal litter using a mixture of clays and zeolites, it is proposed in U.S. Pat. No. 4,437,429 that the zeolite constituent not only be employed in its hydrated state, but also that the water of hydration be the original water of hydration. It is said to be not sufficient that water is added to a previously heat-treated zeolite from which the original water of hydration was driven off.

In general, when zeolites have been utilized for odor suppression, the preferred species have been those with a low framework Si/Al ratio and a high degree of adsorption capacity for water or other highly polar molecules such as ammonia or hydrogen sulfide. The disclosure of the aforesaid U.S. Pat. No. 4,437,429 is somewhat remarkable for its specific disclosure of many of the class of so-called high silica zeolites which are synthesized using organic templating agents such as the tetraalkylammonium ions. These include ZSM-5, ZSM-11, ZSM-12 and ZSM-23. The preferred zeolite species is the natural mineral clinoptilolite, however, which has a nominal framework $SiO_2/Al_2O_3$ molar ratio of about ten. It has also been proposed, U.S. Pat. No. 4,648,977, to use high-silica molecular sieves, including the silica polymorph silicalite, to adsorb toxic organic materials, including mercaptans, from aqueous media for water purification purposes.

SUMMARY OF THE INVENTION

It has been discovered that the odors of certain odorous organic compounds can be essentially eliminated by contact at a temperature within the range of from $-25°$ C. to 100° C., preferably 0° C. to 40° C., with a crystalline siliceous molecular sieve in which at least about 90, and preferably at least about 95, percent of the framework tetrahedral oxide units are $SiO_2$ tetrahedra and which have a sorptive capacity for water at 25° C. and 4.6 torr of less than 10 weight percent. In the case of aluminosilicate molecular sieves, those useful in the practice of the invention have a framework $SiO_2/Al_2O_3$ molar ratio of from about 35 to infinity, and preferably from 200 to 500. All of the siliceous molecular sieves suitably employed have a pore diameter of at least 5.5 Angstroms, preferably at least 6.2 Angstroms. Preferably the adsorption capacity for water vapor at 25° C. and a water vapor pressure $(p/p_o)$ of 4.6 torr is less than 6 weight percent. The efficacy of the molecular sieves employed in the practice of the present invention is not dependent upon the presence of the water of hydration present in the internal cavities of the microporous structure as a result of their hydrothermal formation. In fact, at least a major proportion, usually substantially all, of this original water of hydration is removed in the process of removing any pore-blocking templating agent which may be present in the adsorbent. Calcination effectively removes the organic moieties. Also, water washing or washing with a caustic or dilute mineral acid solution is advantageously utilized to remove extraneous synthesis reagents from the pore system. Lowering of the alkali metal content, particularly the non-zeolitic, i.e., occluded alkali metal compounds can also be beneficial. These procedures also serve to remove the original water of hydration.

The odorous organic compounds suitably treated in the present process can be any organic molecular species having a vapor pressure at 23° C. of greater than 1 mm Hg. It has been observed that many of the compounds having the more objectionable odors, when added to liquid water lowers the surface tension thereof. These compounds are a preferred class of odor-causing materials for treatment in accordance with the present invention. The overall class of substances which can be suitably treated have pleasant as well as unpleasant odors as perceived by human beings. Accordingly, since the greatest benefit of odor control is likely to attend the elimination of those which are generally conceived of as unpleasant, it is preferred that the organic compounds treated in the present process are classifiable in one of the following subgeneric classes:

(a) saturated or unsaturated aliphatic acids and aldehydes containing a single —COOH or —CHO group and containing less than 12 carbon atoms, such as acetic, propionic, butyric, valeric, isovaleric (alpha-methylbutyric), caproic and caprylic acids.

(b) organic sulfur-containing compounds in which the valence of the sulfur atom is less than 6, especially those in which the valence of sulfur is 2, such as the sulfhydryl compounds, i.e. mercaptans and thiophenols of the general formula R—S—H wherein "R" represents an alkyl or alkenyl group containing from 1 to 8 carbon atoms or a phenyl or substituted phenyl group containing from 6 to 9 carbon atoms; the sulfides of the general formula R—(S)$_n$—R wherein n has a value of from 1 to 4 and "R" represents the same groups as in the case of the aforesaid sulfhydryl compounds; the thioaldehydes and thioketones of the general formula

wherein R' is hydrogen or R, and R is an alkyl or alkenyl group containing from 1 to 8 carbon atoms or a phenyl or substituted phenyl group containing from 6 to 9 carbon atoms; and (c) organic nitrogen-containing compounds in which the valence of the nitrogen atom is 3, such as the aliphatic amines of the general formula R$_2$NR' wherein R is hydrogen or R' and R' is an alkyl or alkenyl group having from 1 to 6 carbon atoms; and the heterocyclic nitrogen compounds containing an imino group in which the nitrogen atom is a part of the heterocyclic ring, particularly the pyrroles, and especially the pyrroles in which the alpha position is unsubstituted, and the condensed pyrroles which are the indoles, i.e. indole per se and the substituted derivatives thereof.

Specific compounds within the three subclasses designated above are acetic acid, propionic acid, butyric acid, gamma-hydroxybutyric acid, valeric acid, isovaleric acid (alphamethylbutyric acid), caproic acid, caprylic acid, isobutyraldehyde, methyl mercaptan, ethyl mercaptan, propyl mercaptan, allyl mercaptan, iso-amyl mercaptan, n-butyl mercaptan, crotyl mercaptan, thiophenol, o-methyl thiophenol, allyl disulfide, allyl sulfide, diallylsulfide, amyl sulfide, benzyl sulfide, thiocresol, thioisobuteraldehyde, thioiisovaleraldehyde, γ-hydroxypropylmethyl sulfide, β,β'-dichlorovinyl sulfide, dimethyl tetrasulfide, methyl amine, trimethyl amine, triethyl amine, allyl amine, 3-methylindole (skatole), 4-methyl indole, 7-methyl indole, beta-(indolyl-3)propionic acid, α-amino-β-(indolyl-3)propionic acid (tryptophan), and indoleacetic acid.

The siliceous molecular sieves suitably employed in the practice of the invention include the microporous crystalline aluminosilicates, i.e. the zeolitic molecular sieves as well as the so-called silica polymorphs. With respect to the latter compositions, their crystal lattices are ideally formed entirely of SiO$_2$ tetrahedral units, but the as-synthesized forms commonly contain at least trace amounts of aluminum derived from aluminum impurities in the synthesis reagents. The aluminosilicate molecular sieves comprise the large class of well-known crystalline zeolites. These high-silica molecular sieves are either commercially available or are prepared by methods, well-known in the art, involving direct hydrothermal synthesis or involving certain types of crystal lattice dealuminations. A comprehensive review article by E. M. Flanigen concerning both "high" Si/Al zeolites and silica molecular sieves is published in "Proc. 5th Int. Conf. Zeolites, Naples, 1980", L. V. C. Rees, ed., Heyden, London, pp. 760–780. This article is incorporated herein by reference.

It is a critical aspect of the present invention that the adsorptive capacity for water of the siliceous molecular sieve is less than 10 weight percent under the conditions set forth above. It is another critical aspect that the number of AlO$_2$ tetrahedral units of the crystal lattice, if present at all, be very small compared with the number of SiO$_2$ tetrahedral units. It has been observed that there appears to be some correlation between the framework SiO$_2$/Al$_2$O$_3$ ratio and the adsorptive capacity for water, i.e., the so-called hydrophobicity, of siliceous molecular sieves. It has also been observed, however, that in certain instances, for example in the case of zeolite Beta, wherein a highly siliceous crystal framework is not accompanied by a pronounced hydrophobic character. In this regard, note the zeolite Beta adsorbent described hereinafter immediately following TABLE VII, infra. Thus, while many molecular sieves with framework SiO$_2$/Al$_2$O$_3$ molar ratios of greater than about 18, and especially greater than about 35 exhibit the requisite degree of hydrophobicity for use in the present invention, some do not.

It is known that for the successful elimination of odors it is essential to effectively isolate the source molecules to a level beneath their detection threshold, which in almost all instances is an extremely low concentration level. For example, many mercaptans can be detected by the human olfactory system at a concentration level of 0.00000004 mg./liter of air. Since an ordinary "sniff" involves a quantity of ambient atmosphere of about 50 cc., it becomes apparent that a total amount of such a mercaptan which can be detected by the human sense of smell is only about 0.000000002 mg. Quantities this small exceed the analytical capability of essentially all types of test apparatus, including the gas chromatograph. Nowhere in the prior art has it been suggested that molecular sieve adsorbents are capable of such extreme selectivity as to be able to effectively sequester molecules of organic species to such a degree that residual concentrations over the adsorbent are below the detection threshold.

Accordingly it is apparent that much more than organophilic selectivity is involved in the present process. Without wanting to be bound by any particular theory or theories, it is believed likely that one or more of the following phenomena are involved. One prospect is that a catalytic process is involved whereby the odor molecules are reacted inter se or with other available molecular species such as oxygen to form compounds or polymers which no longer stimulate the olfactory receptors. It is known that high molecular weight organic molecules are significantly less odorous than low molecular weight molecules of similar atomic content and structure; n-decyl and lauryl mercaptans have no more odor than their corresponding alcohols. Thus, polymerization or condensation reactions could be beneficial in the present process. It is another possibility that the adsorption isotherms for the odor molecules for the very highly siliceous zeolite adsorbents involved here have steeper slopes in the region of very low adsorbate partial pressures than has heretofore been appreciated. Since the partial pressures of odor molecules often encountered are frequently quite low, the high silica adsorbents would exhibit superior adsorptive performance for that reason. Still another factor may be van der Waals interactions between the odor molecules and the molecular sieve causing the odor molecules to be tightly bound and trapped within the adsorbent. There may also be a coadsorption of two or more different odor molecules resulting in a synergysm that eliminates the odors of both.

Whatever the reason, it is found that the class of medium to large pore siliceous molecular sieves defined hereinabove, from which the original, as-synthesized water of hydration has been substantially removed, and which have a capacity for adsorbed water of not greater than 10, and preferably not greater than 6, weight percent when measured at 25° C. and a water vapor pressure ($p/p_o$) of 4.6 torr, function in an extraordinary manner with respect to odor elimination. Many of the synthetic zeolites prepared using organic templating agents are readily prepared in a highly siliceous form—some even from reaction mixtures which have no intentionally added aluminum. These zeolites are markedly organophilic and include ZSM-5 (U.S. Pat. No. 3,702,886); ZSM-11 (U.S. Pat. No. 3,709,979); ZSM-35 (U.S. Pat. No. 4,016,245); ZSM-23 (U.S. Pat. No. 4,076,842); and ZSM-38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. No. 4,061,724 and 4,073,865, respectively. To the extent the aforesaid siliceous sieves are synthesized to have $SiO_2/Al_2O_3$ ratios greater than 35, they are frequently suitable for use in the present process without any additional treatment to increase their degree of hydrophobicity. Molecular sieves which cannot be directly synthesized to have both sufficiently high Si/Al and/or degree of hydrophobicity ratios can be subjected to dealumination techniques, fluorine treatments and the like, which result in organophilic zeolite products. High-temperature steaming procedures for treating zeolite Y which result in hydrophobic product forms are reported by P. K. Maher et al., "Molecular Sieve Zeolites," Advan. Chem. Ser. 101, American Chemical Society, Washington, D.C., 1971, p. 266. A more recently reported procedure applicable to zeolite species generally, involves dealumination and the substitution of silicon into the dealuminated lattice site. This process is disclosed in U.S. Pat. No. 4,503,023 issued Mar. 5, 1985 to Skeels at al. Halogen or halide compound treatments for zeolites to increase their hydrophobicity are disclosed in U.S. Pat. Nos. 4,569,833 and 4,297,335.

With respect to the forgoing adsorbents, it is important that the pore system be open so that the internal cavities of the crystals be accessible to the odor molecules. In the case of the aluminosilicates or silica polymorphs produced using large organic templating ions such as tetraalkylammonium ions, it is necessary to remove charge balancing organic ions and any occluded templating material in order to permit adsorption of the odor molecules. In such a removal process and also in the removal of inorganic debris, the original water of hydration is also removed. Upon exposure to the atmosphere a portion of the water of hydration is reacquired, but this does not affect the characteristics of the molecular sieve which are essential for the practice of the present invention, i.e. the molecular sieve can be employed in either a hydrated or dehydrated state, but in general the dehydrated state is preferred. In the case of most of the dealumination procedures referred to above, the original water of dehydration is also removed, and can similarly be replaced, if desired, for the practice of the invention.

It should be pointed out that it is the framework $SiO_2/Al_2O_3$ ratio which is important. This is not necessarily the same ratio as would be indicated by conventional wet chemical analysis. Especially is this the case when dealumination has been accomplished by high temperature steaming treatments wherein aluminum-containing tetrahedral units of the zeolite are destroyed, but the aluminum values remain, at least in part, in the zeolite crystals. For such zeolite products resort must be had to other analytical methods such as X-ray and NMR. One such steam-treated zeolite Y composition, denominated LZ-10, has been found to be particularly useful in the practice of the present process, especially when utilized in combination with the silica polymorph silicalite. The process for preparing LZ-10 is described in detail in U.S. Pat. No. 4,331,694 and in U.S. application Ser. No. 880,561 filed Feb. 23, 1978. A benefit appears to be obtained by such a combination of molecular sieves in all proportions, but each type of adsorbent is preferably present in an amount of at least 10 percent based on the total weight of the two adsorbents (hydrated weight basis).

The method for contacting the odor source with the siliceous molecular sieve adsorbent is not narrowly critical, but is accomplished in a manner that molecular, as distinguished from ionic organic species, are contacted even though liquid water or water vapor is present. The process is believed to be basically an adsorptive process rather than an ion-exchange process. The siliceous molecular sieve can be present in a formulation with diluents, carriers, dispersing media and the like, even aqueous media, and applied to the odor source in that form. The formulation may be in the form of a powder, an agglomerate, an aerosol or in shaped forms, i.e. monoliths, which can be directly applied to a concentrated source of the odor or be positioned within a zone through which a gas stream containing the odor molecules are entrained. Specific applications include the incorporation of the adsorbents in body powders, foot powders, genital sprays, menstrual pads, cat litter, diapers, hand cream, mouthwash, non-woven tissues and the like for the treatment of odors in bathrooms, kitchens, garbage compactors and cans, refrigerators, closets etc.

Temperature conditions at contact are not critical, but are preferably within the range of −25° to 40° C., i.e. the ambient atmospheric temperature occurring in any season and in any geographical location. Pressure is also not a critical factor, but is preferably at least about one atmosphere. The present process is illustrated by the examples appearing hereinafter. A number of high silica aluminosilicates and silica polymorphs were exposed to various odorous substances in a reproducible and consistent manner to determine the absolute or relative amounts of odors adsorbed. In the experiments 40 ml. screwcap vials equipped with Teflon-lined silicone rubber septa were used. The vials were measured to have a capacity of 43.5±0.1 ml.

The activated charcoal adsorbent used was 70/80 mesh chromatographic grade from Analabs, Inc., Hamden Conn., and was labeled ANASORB grade. The adsorbent of interest was weighed into the vial and the vial was capped. The adsorbate was added to the sealed vial with a Hamilton syringe. Samples were shaken by hand to mix the liquid/solid/vapor phases and the vapors in the headspace of the vials were analyzed by gas chromatography within 5 to 20 minutes after weighing and mixing.

To determine the maximum vapor concentrations of the volatile test compounds in air, the pure compounds were placed into 43.5 ml. capacity vials and stored for at least one hour prior to analysis. Generally 2 microliter aliquots from the headspace of the 43.5 ml. vials were analyzed; 2 microliters of room air was injected to maintain consistent atmospheric pressure.

Prior to and after each sample injection the syringe needle was placed into a 200° C. syringe cleaner under vacuum (estimated pressure $<5 \times 10^{-3}$ torr). As a heat source a 100 watt light bulb was placed over the syringe at a distance of 1 to 2 inches. This was done to eliminate any cross contamination from vapor molecules adsorbed on the Teflon parts of the syringe. The heating under vacuum was done for approximately 5 minutes prior to use. Analysis of room air after this cleaning procedure showed no contamination in the syringe.

Gas chromatographic analytical techniques were employed to measure the concentration of odor components in the headspace of the sample vials. The column was a 0.32 mm. I.D.×30 meters, fused silica adsorbent capillary containing a 1 micron internal coating of Carbowax as the adsorbent. A flame ionization detector was utilized to determine retention times. The oven conditions were 50° C. for four minutes and then raised to 150° C. at the rate of 10° C. per minute.

EXAMPLE 1

(a) Ten microliters of isovaleric acid were placed in an empty capped 43.5 ml. vial and the headspace vapors determined in accordance with the above-described test procedures were found to exist in a concentration of 668 ppm. The retention time was 4.83 minutes with a small additional peak present at 4.22 minutes.

(b) To the vial containing the isovaleric acid used in part (a) above was added 0.5 grams of sodium bicarbonate. The concentration of isovaleric acid in the vial headspace was found to be reduced to a concentration of 2.2 ppm. The 4.22 peak observed in part (a) was still present, and in addition new peaks at 4.87, 6.36, 6.61 and 6.94 were produced.

(c) To the vial containing the isovaleric acid used in part (a) above was added 0.5 grams of an equal parts by weight mixture of activated silicalite and zeolite LZ-10. The concentration of isovaleric acid in the vial headspace was found to be reduced to 0.82 ppm. and in addition the peak at 4.22 was removed without the introduction of any new peaks.

EXAMPLE 2

(a) The same test and analytical procedures as carried out in Example 1, supra, were carried out using isobutyraldehyde as the odor constituent. The test material was found to have light impurities with retention times between 3 and 6 minutes, and isobutyric acid having a retention time of 18.88 minutes. The retention time of the isobutyraldehyde was 16.74 minutes. The addition of 0.5 grams of sodium bicarbonate to 30 microliters of isobutyraldehyde reduced the concentration of headspace vapors to 21.4% of the concentration level of the isobutyraldehyde alone. Twenty two percent of the original isobutyric acid concentration in the headspace remained after the addition of the sodium bicarbonate, and there was only a slight reduction in the concentration of the light impurities.

(b) Using the same procedure as in part (a) above except that 0.5 grams of activated charcoal (Columbia Grade JXC 6/8) was employed instead of sodium bicarbonate, it was found that 4.5% of the isobutyraldehyde concentration and 3.0% of the isobutyric acid concentration remained in the vial headspace. The light impurities were removed, however.

(c) Using the same procedures of parts (a) and (b), 0.5 grams of an equal parts mixture of silicalite and zeolite LZ-10 when added to 30 microliters of isobutyraldehyde resulted in the removal of 99.3% of the isobutyraldehyde and 98.9% of the isobutyric acid of the headspace concentration. Some of the light components were not removed.

EXAMPLES 3–10

Eight different adsorbent materials were tested for their ability to deodorize the airspace over triethylamine, a common constituent of various animal and human excretions. In carrying out the tests 500 mg. of the adsorbent solid were placed in a 43.5 ml. vial and the triethylamine added in sufficient quantity to give a weight loading of triethylamine of 4.37%. For purposes of comparison, triethylamine was placed in a vial with no adsorbent. The headspace vapors in the vials were analyzed in the same manner as described hereinabove. The adsorbent identified as LZ-20 in Example 3, and in subsequent Examples, is a steam-stabilized form of zeolite Y prepared in a manner essentially the same as employed in the preparation of LZ-10 except the steaming conditions were less rigorous resulting in a product having a water adsorption capacity at 25° C. and a water vapor pressure (p/p$_o$) of 4.6 torr of about 10 weight percent, a sodium content (as Na$_2$O) of 0.2 weight percent (anhydrous basis). The adsorbent identified as LZ-105-5 in Example 10 and subsequent examples was a zeolite of the ZSM-5 type prepared in the absence of organic templating material and acid-washed to produce a zeolite having a SiO$_2$/Al$_2$O$_3$ molar ratio of about 36.7 and a Na$_2$/Al$_2$ ratio of 1.19. The adsorbent composition of Example 6 was an equal parts by weight mixture of LZ-10 and silicalite. The analytical results are set forth below in tabular form.

TABLE I

| | Adsorbate | TEA in Headspace, ppm |
|---|---|---|
| | None | 470. |
| Ex. 3 | LZ-20 | .003 |

TABLE I-continued

| | Adsorbate | TEA in Headspace, ppm |
|---|---|---|
| Ex. 4 | LZ-10 | .010 |
| Ex. 5 | Activated Charcoal | .017 |
| Ex. 6 | LZ-10; Silicalite | .033 |
| Ex. 7 | Silica gel | 19.74 |
| Ex. 8 | Silicalite | <108. |
| Ex. 9 | NaHCO$_3$ | <108. |
| Ex. 10 | LZ-105-5 | <108. |

EXAMPLES 11–20

The same test as carried out in Examples 3–10 was done with isobutyraldehyde as the odor composition. The saturated headspace concentration without any adsorbent was 772 ppm. After treatment with the adsorbate, the amount of isobutyraldehyde was determined to be:

TABLE II

| | Adsorbate | Isobutyraldehyde in Headspace; ppm |
|---|---|---|
| Ex 11 | None | 772 |
| Ex 11 | LZ-20 | .007 |
| Ex 12 | LZ-105-5; LZ-20* | .009 |
| Ex 13 | Silicalite; LZ-20* | .026 |
| Ex 14 | LZ-105-5 | .062 |
| Ex 15 | Silicalite | .069 |
| Ex 16 | Activated Charcoal | .069 |
| Ex 17 | LZ-10; silicalite* | .093 |
| Ex 18 | LZ-10 | .108 |
| Ex 19 | Silica Gel | .479 |
| Ex 20 | NaHCO$_3$ | 177.56 |

*Parts by weight

EXAMPLE 21

A combination of isovaleric acid and butyl mercaptan (butanethiol) was used to determine the weight percent loading on a composition of equal parts by weight of LZ-10 and silicalite. The results are:

TABLE III

| Weight Percent Loading On Adsorbate | | Remaining (ppm) In Air After Treatment | |
|---|---|---|---|
| Isovaleric Acid | Butanethiol | Isovaleric Acid | Butanethiol |
| None | None | 1.58 | 206 |
| 0.93 | 0.83 | .0012 | .0011 |
| 1.86 | 1.67 | .0011 | .0011 |
| 2.79 | 2.65 | .0019 | .0097 |
| 3.71 | 3.33 | .0014 | .0136 |
| 7.43 | 6.67 | .0021 | .0762 |
| 9.29 | 8.34 | .0174 | 4.73 |

EXAMPLES 22–29

The same test as Example 21 was conducted on a number of other materials. The results are:

TABLE IV

| | Adsorbate | Headspace Composition, ppm | |
|---|---|---|---|
| | | Isovaleric Acid | Butanethiol |
| | None | 1.58 | 206 |
| Ex 22 | LZ-20 | .0104 | .2266 |
| Ex 23 | LZ-10 | .0038 | .5768 |
| Ex 24 | LZ-105-5 | .5846 | .0659 |
| Ex 25 | Silicalite | .3160 | 4.326 |
| Ex 26 | Silica Gel | .8216 | 6.386 |
| Ex 27 | Silicalite; LZ-20* | .0237 | .2060 |
| Ex 28 | LZ-105-5; LZ-20* | .0111 | .0659 |
| Ex 29 | Silicalite; LZ-20* | .0174 | .0082 |

*Equal parts by weight

EXAMPLE 30

The samples from Examples 22–29 were allowed to remain capped at room temperature and re-tested after twenty-four hours. The following results were obtained:

TABLE V

| | Headspace Composition; ppm | |
|---|---|---|
| Adsorbate | Isovaleric Acid | Butanethiol |
| None | 1.58 | 206 |
| Silicalite | .0458 | .1133 |
| LZ-20 | .0190 | .7416 |
| LZ-10 | .0790 | 2.06 |
| LZ-105-5 | .4266 | 2.47 |
| Silicalite; LZ-10 | .5214 | 28.84 |

EXAMPLES 30A–34

Fresh garlic was finely minced and 0.5 gram thereof was placed in each of six 43.5 ml capped vials. Adsorbent materials in the amount of 0.5 gram were added to five of the vials and the contents shaken. Gas chromatograph analyses were performed on the headspace vapors immediately and after a period of 24 hours. The results are set forth in Table VI below:

TABLE VI

| | Adsorbate | Odor Remaining, % of Saturation | |
|---|---|---|---|
| | | Immediately | After 24 hrs |
| | None | 100 | 100 |
| Ex 30A | Silicalite; LZ-10* | 0.29 | 0.61 |
| Ex 31 | LZ-10 | 0.58 | 4.10 |
| Ex 32 | Activated Charcoal | 0.25 | 0.47 |
| Ex 33 | Silicalite | 0.18 | 0.29 |
| Ex 34 | NaHCO$_3$ | 29 | 36 |

*Equal parts by weight

EXAMPLES 35–39

The same test procedure as in Examples 22–25 was carried out using 0.5 gram of freshly chopped onion. The results are set forth in Table VII below:

TABLE VII

| | Adsorbate | Odor Remaining, % of Saturation | |
|---|---|---|---|
| | | Immediately | After 24 hrs |
| | None | 100 | 100 |
| Ex 35 | Silicalite; LZ-10* | 7.3 | 5.1 |
| Ex 36 | Silicalite | 6.5 | 1.9 |
| Ex 37 | LZ-10 | 21.10 | 2.5 |
| Ex 38 | Activated Charcoal | 7.5 | 9.1 |
| Ex 39 | NaHCO$_3$ | 35 | 59 |

*Equal parts by weight

To establish that certain highly siliceous molecular sieves lacking the requisite degree of hydrophobicity do not qualify as adsorbents for use in this invention, a zeolite Beta having a framework $SiO_2/Al_2O_3$ molar ratio of 25.4 and a water sorption capacity at 25° C. and 4.6 torr of 14.28 weight percent, was contacted with isovaleric acid. It was found by a subjective "sniff" test that an appreciable amount of odor due to the isovaleric acid remained after contact with the adsorbent.

A particular sample of the silica polymorph TEA-silicate (U.S. Pat. No. 4,104,294) having a framework $Si/Al_2$ molar ratio of 381 and which in general is characteristically not strongly hydrophobic, was found to have a water sorption capacity at 25° C. and 4.6 torr of only 2.3 weight percent water. When tested with isovaleric acid, some odor was detectable. The reason for this apparent anomaly is now known.

What is claimed is:

1. Process for removing odors from an environment attributable to an organic molecular species which comprises contacting and adsorbing at a temperature of from −25° C. to 100° C. the molecules of the organic molecular species with a crystalline siliceous molecular sieve adsorbent which has been at least partially activated, in which at least about 90 percent of the framework tetrahedral oxide units are $SiO_2$ tetrahedra, which has pore diameters of at least 5.5 Angstroms and has a capacity for adsorbed water of not greater than 10 weight percent when measured at 25° C. and at a water vapor pressure of 4.6 torr, said contacting and adsorbing of the organic molecular species being to such a degree that residual concentrations thereof over the adsorbent are below the detection threshold of the human sense of smell.

2. Process according to claim 1 wherein the siliceous molecular sieve has a capacity for adsorbed water of not greater than 6 weight percent.

3. Process according to claim 2 wherein the siliceous molecular sieve is a silica polymorph.

4. Process according to claim 1 wherein the siliceous molecular sieve is an aluminosilicate having a framework $SiO_2/Al_2O_2$ molar ratio greater than 35.

5. Process according to claim 4 wherein the aluminosilicate has a $SiO_2/Al_2O_3$ molar ratio of from 200 to 500.

6. Process according to claim 1 wherein the siliceous molecular sieve comprises a mixture of a silica polymorph and an aluminosilicate having a framework $SiO_2/Al_2O_3$ ratio of from 200 to 500.

7. Process according to claim 1 where the odor-causing organic compound has a vapor pressure at 23° C. of greater than 1 mm. Hg and which when added to liquid water lowers the surface tension thereof.

8. Process according to claim 1 wherein the crystalline siliceous molecular sieve contains less than 0.2 weight percent alkali metal on an anhydrous basis.

9. Process for removing an odor from an environment attributable to an aliphatic acid or aldehyde containing a single —COOH or —CHO group and containing less than 12 carbon atoms which comprises contacting and adsorbing at a temperature of from −25° C. to 100° C. said aliphatic acid or aldehyde with a crystalline siliceous molecular sieve which has been at least partially activated, in which at least about 90 percent of the framework tetrahedral oxide units are $SiO_2$ tetrahedra, which has pore diameters of at least 5.5 Angstroms and has a capacity for adsorbed water of not greater than 10 weight percent when measured at 25° C. and at a water vapor pressure of 4.6 torr, said contacting and adsorbing of the said aliphatic acid or aldehyde being to such a degree that residual concentrations thereof over the adsorbent are below the detection threshold of the human sense of smell.

10. Process according to claim 9 wherein the organic compound is isovaleric acid.

11. Process according to claim 9 wherein the organic compound is butyric acid.

12. Process for removing an odor from an environment attributable to an organic sulfur-containing compound in which the valence of the sulfur atom is less than 6 which comprises contacting and adsorbing at a temperature of from −25° C. to 100° C. said organic sulfur-containing compound with a crystalline siliceous molecular sieve which has been at least partially activated, in which at least about 90 percent of the framework tetrahedral oxide units are $SiO_2$ tetrahedra, which has pore diameters of at least 5.5 Angstroms and has a capacity for adsorbed water of not greater than 10 weight percent when measured at 25° C. and at a water vapor pressure of 4.6 torr, said contacting and adsorbing of the said sulfur-containing compound being to such a degree that residual concentrations thereof over the adsorbent are below the detection threshold of the human sense of smell.

13. Process according to claim 12 wherein the organic compound has the general formula R—S—H wherein R represents an alkyl or alkenyl group containing from 1 to 8 carbon atoms or a phenyl or substituted phenyl group containing from 6 to 9 carbon atoms.

14. Process for removing an odor environment attributable to an organic nitrogen-containing compound in which the valence of the nitrogen atom is 3 which comprises contacting and adsorbing at a temperature of from −25° C. to 100° C. said organic nitrogen-containing compound with a crystalline siliceous molecular sieve which has been at least partially activated, in which at least about 90 percent of the framework tetrahedral oxide units are $SiO_2$ tetrahedra, which has pore diameters of at least 5.5 Angstroms and has a capacity for adsorbed water of not greater than 10 weight percent when measured at 25° C. and at a water vapor pressure of 4.6 torr, said contacting and adsorbing of the said nitrogen-containing compound being to such a degree that residual concentrations thereof over the adsorbent are below the detection threshold of the human sense of smell.

15. Process according to claim 14 wherein the nitrogen-containing compound has the general formula $R_2NR'$ wherein R is hydrogen or R' and R' is an alkyl or alkenyl group having from 1 to 6 carbon atoms.

16. Process according to claim 15 wherein the nitrogen-containing compound is triethylamine.

17. Process according to claim 14 wherein the nitrogen-containing compound is pyrrole or a substituted pyrrole.

18. Process according to claim 14 wherein the nitrogen-containing compound is 3-methylindole.

* * * * *